(12) United States Patent
Chen et al.

(10) Patent No.: US 6,522,321 B1
(45) Date of Patent: Feb. 18, 2003

(54) ROLLER RETAINER FOR A THIRD AXIS OF A MOUSE

(75) Inventors: Le-Tien Chen, Chungho (TW); Chien Pang Lin, Taipei Hsien (TW)

(73) Assignee: Dexin Corporation, Taipei Hsien (TW)

( * ) Notice: Subject to any disclaimer, the term of this patent is extended or adjusted under 35 U.S.C. 154(b) by 224 days.

(21) Appl. No.: 09/702,610

(22) Filed: Nov. 1, 2000

(51) Int. Cl.$^7$ ................................................. G09G 5/08
(52) U.S. Cl. ........................ 345/163; 345/156; 345/157; 345/164; 345/165; 345/167; 345/166
(58) Field of Search ................................ 345/156, 157, 345/163–167

(56) References Cited

U.S. PATENT DOCUMENTS 5,912,661 A * 6/1999 Siddiqui ..................... 345/166
6,188,393 B1 * 2/2001 Shu ............................ 345/184
6,337,680 B1 * 1/2002 Hamaji ....................... 345/157
6,340,966 B1 * 1/2002 Wang et al. ................ 345/163

* cited by examiner

Primary Examiner—Richard Hjerpe
Assistant Examiner—Jennifer T. Nguyen
(74) Attorney, Agent, or Firm—Rosenberg, Klein & Lee

(57) ABSTRACT

A roller retainer for the third axis of a mouse comprises a seat, an upper cover and a roller seat. The seat has a housing, a circuit board and other components. The circuit board is installed with a microswitch and an IR module seat. A via hole is formed at the middle portion of the roller seat. The via hole serves to place a roller seat therein. A rear end of the roller seat is buckled to the rear inner end of the upper cover, and the roller seat may be like a suspending arm. The roller seat has a function of plastic resilient and therefore, no elastic spring is necessary. The roller seat is installed with an upper cover and other components is still installed in the seat. Therefore, no space in the circuit board is occupied and thus cost is reduced and material can be prepared easily.

7 Claims, 5 Drawing Sheets

ROLLER RETAINER FOR A THIRD AXIS OF A MOUSE

FIELD OF THE INVENTION

The present invention relates to a roller retainer for the third axis of a mouse, and especially to roller retainer, thereby, the roller seat is fixed the upper cover, and thus the space of the circuit board will not be occupied. By the elasticity of the roller seat, the roller seat can move upwards and downwards without needing any spring. Furthermore, it can be assembled easily.

BACKGROUND OF THE INVENTION

Nowadays, the mouse is a necessary device to a computer. Since the mouse can be operated easily and learnt conveniently, it is widely used. Furthermore, in the structure of a mouse, a track ball is installed at the bottom of the mouse. If the user holds the mouse and move it on a table, then the track ball will rotate and thus the cursor will move on a screen. However, the development of software is faster and faster, the design of mouse must be improved with the development of mouser. Furthermore, three dimensional software are developed, while mice are two dimensional, which can not meet the requirement of the software. In order to solve the problem of three-dimensional software, and research of mice with a third input axis is performed. Thus, various novel mice are generated.

Moreover, a prior art mouse with a third axis is illustrated in FIG. 1. The mouse has an upper cover (not shown), a seat 1a, a roller seat 2a, etc. the seat 1a includes a housing 10a, a track ball unit 11a (including a track ball 110a, a photo wheel 111a, and other connecting units), and a circuit board 12a. The roller seat 2a includes a roller 20a, a shaft 21a firmly secured to the circuit board 12a. A spring 22a is engaged to the shaft 21. The spring 22a serves to move the roller 20a upwards or downwards. A plurality of guide tracks 23a are protruded from the seat 1a. The guide tracks are placed at the left and right sides of the shaft 21a. Each of the guide track is installed with a light guide hole 24a. One side of one hole 24a is installed with an emitting element 120a, while one side of another hole 24a is installed with a receiving element 121a. The emitting element 120a and receiving element 121a are connected the circuit control units of the circuit board 12a. The circuit board 12a is installed with a left button switch 122a, a middle button switch 123a, a right button switch 124a. These switches 122a, 123a, and 124a are connected to the circuit control unit.

Although the aforesaid mouse may solve the problems of third axis, the application of the space in the circuit board is too complex, and thus has the following advantages:
1. In the prior art, the roller seat is installed on the seat, the shaft and guide track and other elements are necessary to be installed on a circuit board. Therefore, the usable area on the circuit board is reduced. Since the space is narrow, horizontal chips must be used. While these chips have higher cost and can not be prepared easily.
2. The spring serves to provide an elasticity to the roller seat for restoring, but this increases the complex in assembly and the efficiency in assembly is effected.

Therefore, it is appreciated that the prior art structure has some defects which are necessary to be improved.

SUMMARY OF THE INVENTION

Accordingly, the primary object of the present invention is to provide a roller retainer for the third axis of a mouse, wherein a roller seat is fixed to an upper cover and an upper button. No space of the circuit board is occupied. A most common vertical chip serves to fix in the longitudinal direction through an IR module so that the same parts identical the photo wheel can be used, therefore, the cost is low and the material can be prepared easily.

Another object of the present invention is to provide a roller retainer for the third axis of a mouse, wherein by the plastic elasticity of the roller seat, a restoring force is formed, therefore, the roller seat may move upwards or downwards without needing spring.

To achieve the abovesaid object, the present invention provides a roller retainer for the third axis of a mouse comprises a seat, an upper cover and a roller seat. The seat has a housing, an upper cover, and a circuit board, and other components. The circuit board is installed with a left button switch, a middle button switch, a right button switch and an IR module seat. The roller seat has a long plate shape. The middle portion at the front end of the roller seat is installed with a via hole. The via hole is placed with the roller. A rear end of the roller is a groove which serves to be buckled in the tenons at the rear inner surface of the key. The connection is a fixing end and further the roller seat is like a suspending arm. Moreover, the roller seat has the function of plastic resilience and thus no spring is necessary. Therefore, the cost for assembling a spring is saved. The roller seat is installed on the upper cover. While the other element is installed on the seat. Therefore, the original function is retained, moreover, the space of the circuit board is not occupied. A most common vertical chip serves to fix in the longitudinal direction through an IR module so that the same parts identical the photo wheel can be used. Thus, the cost is low and material can be prepared easily.

The seat includes a microswitch and an IR module seat (infrared transceiver module seat). The upper cover includes a cover and a key body; and the cover is combined with the casing of the seat. The roller seat has a rear end fixed to a housing of the mouse and is like a suspending arm, and the roller seat is configured with respect to the microswitch of the seat and is spaced therewith. By aforesaid structure, the roller seat will not occupy any space of a circuit board on the seat, and by the plastic elasticity of the roller seat, and roller seat moves upwards or downwards.

The various objects and advantages of the present invention will be more readily understood from the following detailed description when reading in conjunction with the appended drawing.

DETAILED DESCRIPTION OF THE PREFERRED EMBODIMENTS

Figure 1:
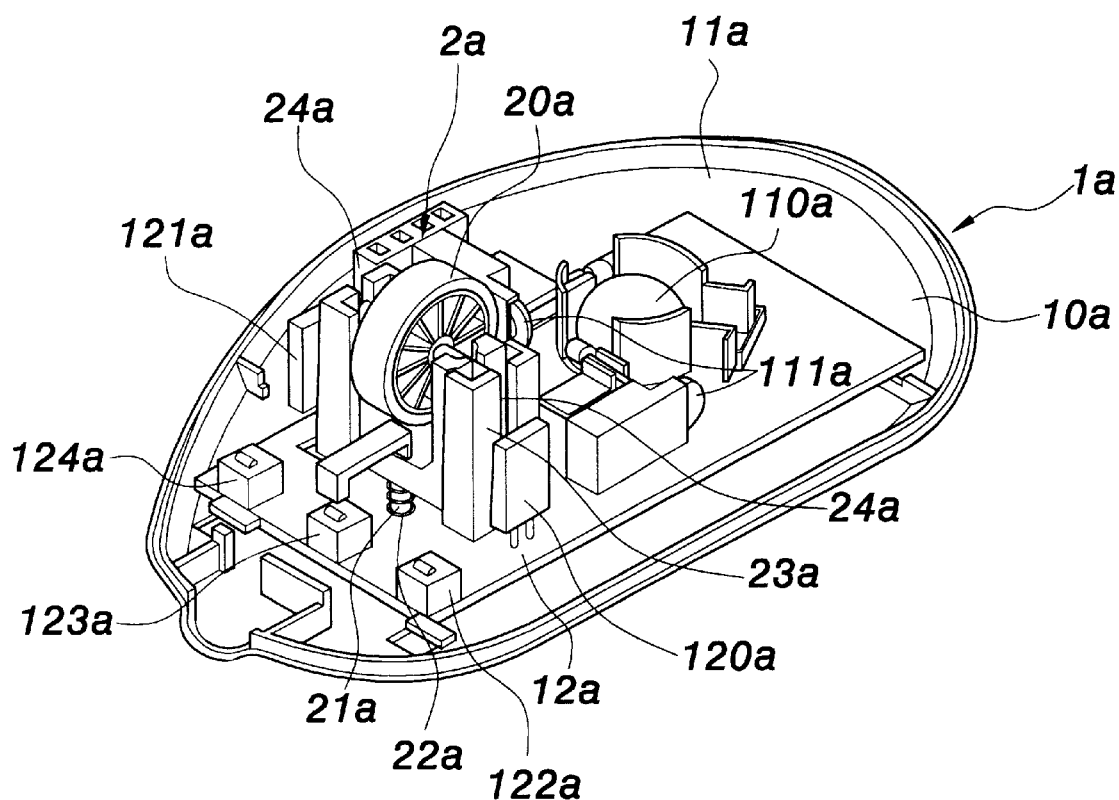
FIG. 1 is an exploded perspective view of the roller retainer for the third axis of a mouse according to the present invention.
Figure 2:
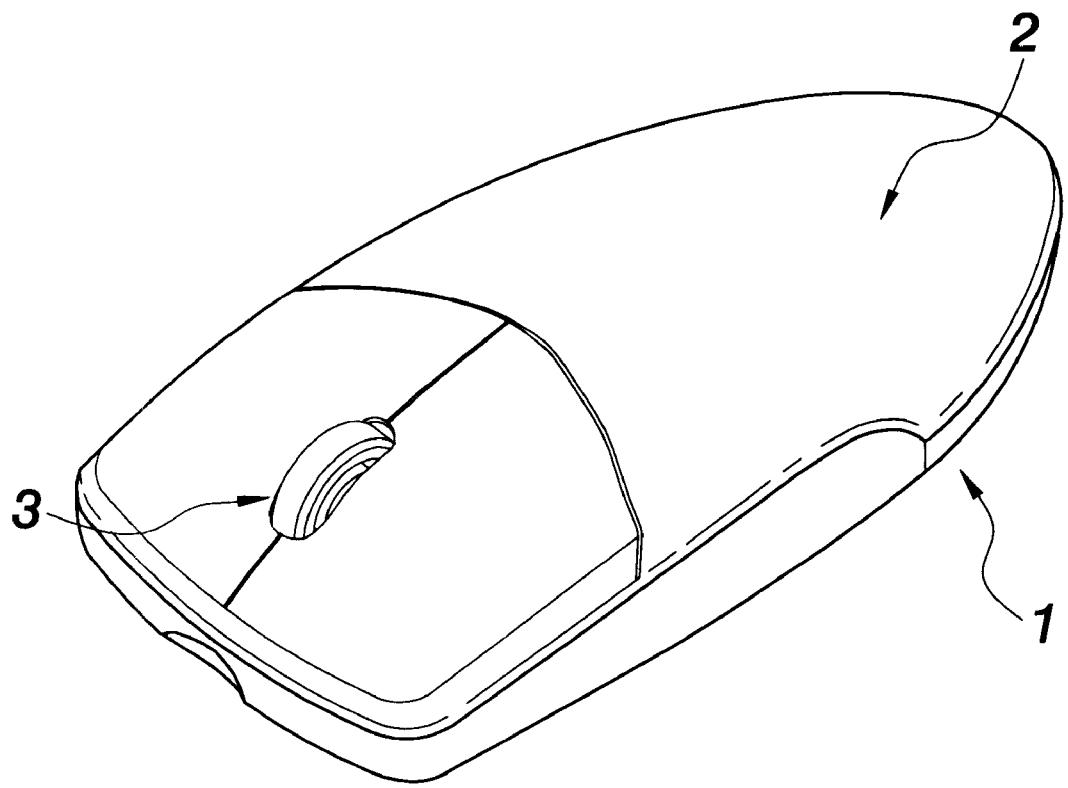
FIG. 2 is an assembled perspective view of the roller retainer for the third axis of a mouse of the present invention.
Figure 3:
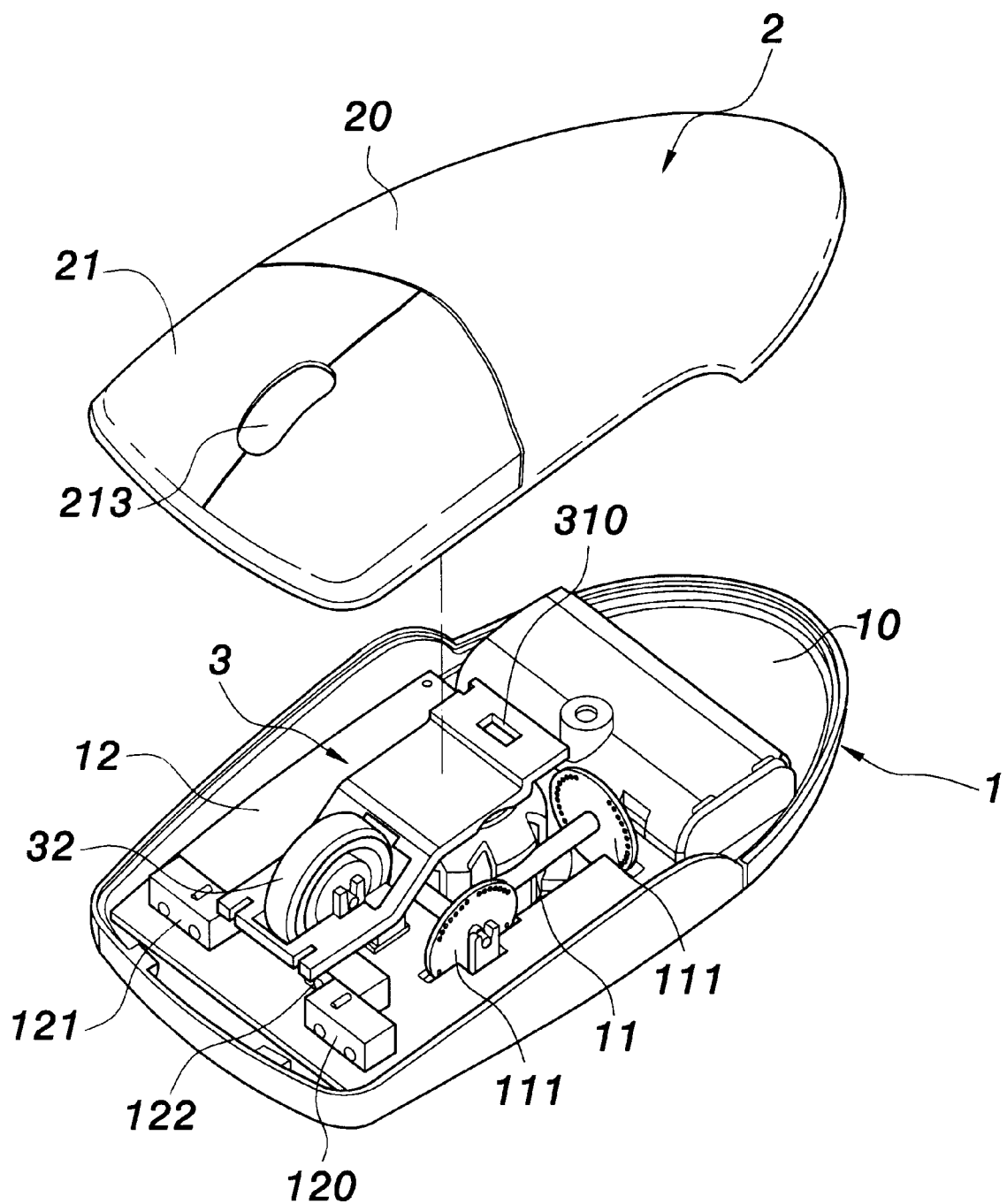
FIG. 3 is an exploded perspective view of the roller retainer for the third axis of a mouse in the present invention.
Figure 4:
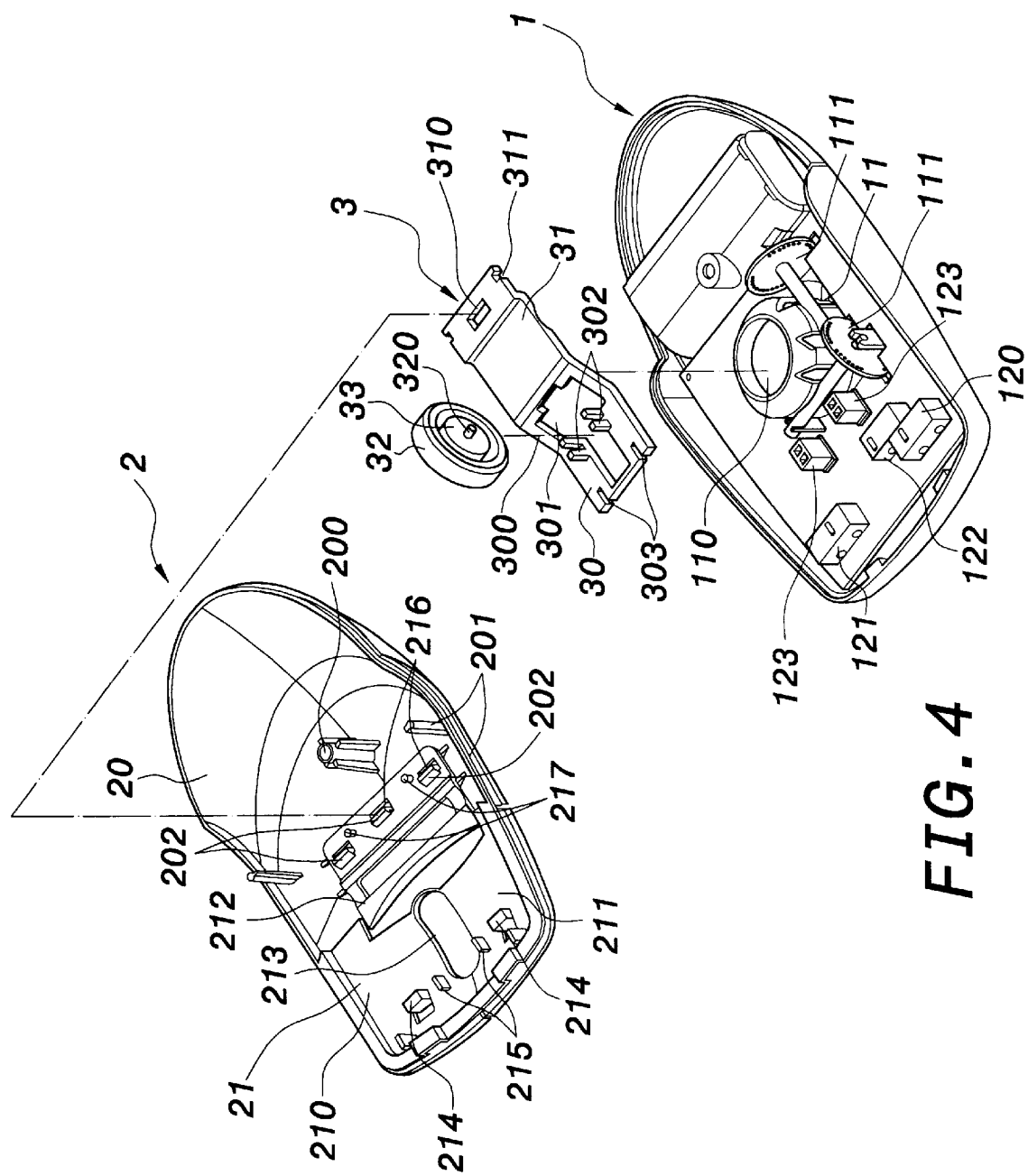
FIG. 4 is an exploded perspective view of the roller retainer for the third axis of a mouse according to the present invention.

Referring to FIGS. 2 to 4, the assembled perspective view and exploded perspective view of the present invention are illustrated. The roller retainer for the third axis of a mouse according to the present invention is illustrated. The roller retainer for the third axis of a mouse includes a seat 1, an upper cover 2, and a roller seat 3. The seat 1 includes a casing 10, a track ball unit 11 (including a track ball 110, an optic wheel 111, etc.) and a circuit board 12. A left button switch 120, a right button switch 121, and a middle button switch 122 (these switch are micro-switch) and a set of IR module 123 (infrared transceiver module) and others. Since the units in the seat 1 is a prior art and not the main concerns of the present invention, thus the details will not be further described.

The upper cover 2 includes a cover 20, and a key body 21. The upper cover 2 is combined with the housing 10 of the seat 1 to be as a casing of the mouse. The inner surface of the cover 20 is installed with a post 200. The post 200 is screwedly connected to the seat 1. And the inner periphery of the cover 20 is installed with a buckling unit 201, After assembling the buckling unit 201, it will resist against the fixing position of the circuit board 12. A front end of the cover 20 has a hole (not shown). A rear end of the hole has an edge frame which is installed with three tenons 202. A key body 21 is installed in the hole (not shown). The key body 21 includes a left button 210, a right button 211, and a joint end 212. The connection of the left button 210 and right button 211 has a via hole 213. Each of the left button 210 and right button 211 is installed with a protrusion 214. The two protrusions are correspondent to the left button switch 120 and right button switch 121, respectively. Therefore, as the user presses the left button 210 or right button 211, then the left button switch 120 or the right button switch 121 will be driven so that the signal is transferred. Each edge frame at two sides of the via hole 213 is installed with a guide block 215, and the joint end 212 is installed with three buckling grooves 216 so that the joint end 212 of the key body 21 may pass through the groove (not shown) to be inserted inwards so that the buckling groove 216 is engaged with the tenons 202 and fixed therewith.

The roller seat 3 is a long stripe and is divided into a front end 30 and a rear end 31. The front end 30 is an inclined surface 300. The inclined surface 300 causes the lower end of the rear end 31 to be received in the track ball unit 11. The middle portion of the front end 30 is installed with a via hole 301. Each of the two sides of the via hole 301 is installed with a protruded clamping groove 302. The via hole 301 serves for placing a roller 32 therein. An upper end of the roller 32 protrudes out of the surface of the upper cover 2. The inner edge of the roller 32 is installed with a photo grid rotary disk 33 and an axial rod 320 protruded from the two sides of the roller 32 and the grid rotary disk 33. The axial rod 320 is buckled to the clamping grooves 302. Furthermore, each of the two sides of the front edge of the front end 30 is installed with a guide groove 303 which is matched to the guide block 215 of the upper cover 2 of that the roller seat 3 so that as the roller seat 3 moves upwards or downwards, the roller seat 3 will not shift leftwards or rearwards. The rear end 31 is installed with a groove 310 for being engaged with the tenons 202 at the rear end of the inner surface of the upper cover 2. Each of the two sides of the rear end 31 is installed with a notch 311 for being engaged with the post 217 at the inner rear end of the key body 21.

Figure 5A:
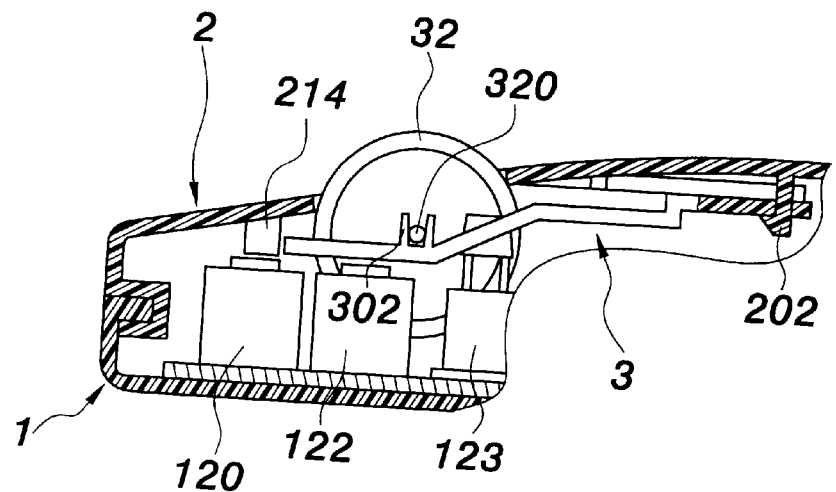
FIG. 5A shows the action of the roller seat in the present invention.
Figure 5B:
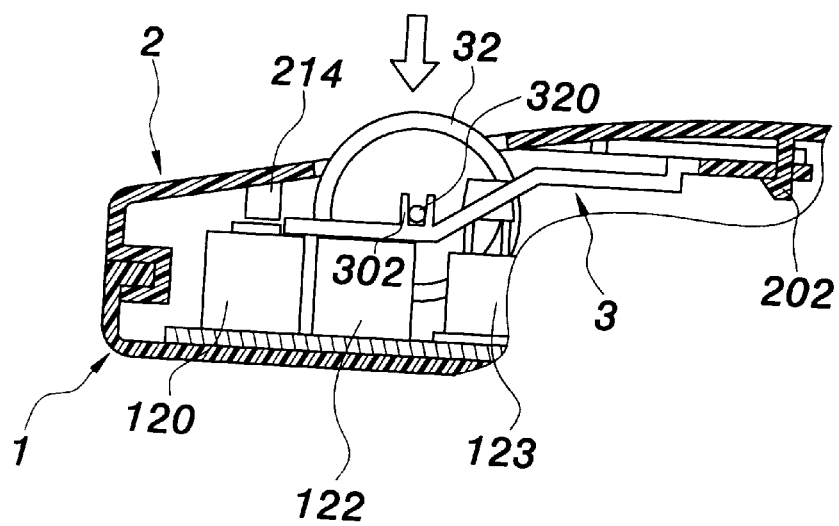
FIG. 5B shows the action of the roller seat in the present invention.

Referring to FIGS. 5A and 5B, one end of the roller seat 3 is fixed to the upper cover 2 so that the roller seat 3 is presented as a plate hanging arm. The roller seat 3 is configured with respect to the micro switch and is spaced therewith. Therefore, when the roller 32 drives the roller seat 3, it can directly touch the middle button switch 122, and by the plastic elasticity of the roller seat 3, a restoring force is formed, therefore, the roller seat 3 may move upwards or downwards without needing spring.

Therefore, by the roller retainer for the third axis of a mouse of the present invention, the following advantages can be acquired.

1. In the present invention, the roller seat is fixed the upper cover, and thus the space of the circuit board will not be occupied.
2. In the present invention, by the elasticity of the roller seat, the roller seat can move upwards and downwards without needing any spring. Furthermore, it can be assembled easily.
3. In the present invention, a most common vertical chip serves to fix in the longitudinal direction through an IR module so that the same parts identical to the photo wheel can be used, therefore, the cost is low and the material can be prepared easily.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A roller retainer for the third axis of a mouse comprising:
   a seat including a microswitch and an infrared transceiver module seat;
   an upper cover including a cover and a key body, the key body having formed thereon a plurality of grooves at a rear portion thereof, the cover having disposed on an inner surface thereof a plurality of tenons, the tenons being inserted into the grooves to affix the key body to the cover, the cover being combined with a casing of the seat; and
   a roller seat having a hole in a rear end thereof, at least one of the plurality of tenons on the cover being inserted in the hole of the roller seat to affix the rear end to a housing of the mouse so as to be suspended therefrom, the roller seat being configured with respect to the micro switch of the seat and is spaced therewith, by aforesaid structure, the roller seat will not occupy any space of a circuit board on the seat, the roller seat moves upwards or downwards by plastic elasticity thereof.

2. The roller retainer for the third axis of a mouse as claimed in claim 1, wherein a front end of the upper cover has a guide block, and a front end of the roller seat has a guide groove, the guide groove is configured with respect to the guide block.

3. The roller retainer for the third axis of a mouse as claimed in claim 1, wherein a middle portion of the roller seat is installed with a via hole, and a roller is installed in the via hole.

4. The roller retainer for the third axis of a mouse as claimed in claim 1, wherein the roller seat is made of plastics.

5. The roller retainer for the third axis of a mouse as claimed in claim 1, wherein each of two sides of the via hole of the roller seat is installed with a protruded clamping groove, and an axial rod is protruded with an axial rod; and the axial rod is coupled in the clamping groove.

6. The roller retainer for the third axis of a mouse as claimed in claim 1, wherein an inner edge of the roller is installed with a photo grid rotary disk, and the photo grid rotary disk is configured with respect to the IR module seat.

7. A roller retainer for the third axis of a mouse comprising:
- a seat including a microswitch and an infrared transceiver module seat;
- an upper cover including a cover and a key body, the key body having disposed at an inner rear end thereof with two posts, the cover being combined with a casing of the seat; and
- a roller seat having formed thereon a slot at opposing sides of a rear end thereof, the rear end fixed to a housing of the mouse so as to be suspended therefrom, each of the two posts of the key body being inserted into a corresponding slot in the roller seat, the roller scat being configured with respect to the micro switch of the seat and is spaced therewith, by aforesaid structure, the roller seat will not occupy any space of a circuit board on the seat, roller seat moves upwards or downwards by the plastic elasticity thereof.

* * * * *